(12) United States Patent
Komatsu et al.

(10) Patent No.: US 9,279,966 B2
(45) Date of Patent: Mar. 8, 2016

(54) ZOOM LENS AND IMAGING APPARATUS

(71) Applicant: FUJIFILM Corporation, Tokyo (JP)

(72) Inventors: Daiki Komatsu, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 16 days.

(21) Appl. No.: 14/507,041

(22) Filed: Oct. 6, 2014

(65) Prior Publication Data
US 2015/0022901 A1 Jan. 22, 2015

Related U.S. Application Data

(63) Continuation of application No. PCT/JP2013/002356, filed on Apr. 5, 2013.

(30) Foreign Application Priority Data

Apr. 9, 2012 (JP) ................................. 2012-088064

(51) Int. Cl.
*G02B 15/14* (2006.01)
*G02B 15/173* (2006.01)
(Continued)

(52) U.S. Cl.
CPC ................ *G02B 15/14* (2013.01); *G02B 13/18* (2013.01); *G02B 15/173* (2013.01); *G02B 27/646* (2013.01)

(58) Field of Classification Search
CPC ..................................................... G02B 15/17
USPC ....................................................... 359/688
See application file for complete search history.

(56) References Cited

U.S. PATENT DOCUMENTS 5,757,554 A 5/1998 Fukami
5,808,809 A 9/1998 Yahagi
(Continued)

FOREIGN PATENT DOCUMENTS

JP 09-15501 1/1997
JP 10-31157 2/1998
(Continued)

OTHER PUBLICATIONS

International Search Report, PCT/JP2013/002356, Jul. 2, 2013.

*Primary Examiner* — James Jones
(74) *Attorney, Agent, or Firm* — Young & Thompson

(57) ABSTRACT

A zoom-lens consists of a positive-first-lens-group, fixed during magnification-change, a negative-second-lens-group, which moves from object-side toward image-side during magnification change from wide-angle-end to telephoto-end, a negative-third-lens-group, which corrects movement of an image-plane during magnification-change, and a positive-fourth-lens-group, which is fixed during magnification-change and includes a stop, in this order from object-side. The first-lens-group consists of a negative-1a-th-lens-group, fixed during focusing, a positive-1b-th-lens-group, which moves during focusing, and a positive-1c-th-lens-group, fixed during focusing, in this order from object-side. The second-lens-group consists of a negative-2a-th-lens-group and a positive-2b-th-lens-group, and a distance therebetween is changed during magnification-change. The third-lens-group moves in such a manner that a distance from the fourth-lens-group at telephoto-end is narrower than a distance from the fourth-lens-group at wide-angle-end. Predetermined conditional-formulas about a length from a most-object-side surface in the first-lens-group to the stop, a focal-length at wide-angle-end and a focal-length of the 1b-th-lens-group are satisfied.

17 Claims, 7 Drawing Sheets

(51) Int. Cl.
*G02B 13/18* (2006.01)
*G02B 27/64* (2006.01)

(56) References Cited

U.S. PATENT DOCUMENTS

| | | | |
|---|---|---|---|
| 5,966,246 A | 10/1999 | Yoshikawa | |
| 6,084,721 A | 7/2000 | Terasawa | |
| 2011/0080651 A1 | 4/2011 | Sakamoto | |
| 2012/0314291 A1* | 12/2012 | Kogo | G02B 15/173 359/557 |

FOREIGN PATENT DOCUMENTS

| | | |
|---|---|---|
| JP | 10-62686 | 3/1998 |
| JP | 10-161026 | 6/1998 |
| JP | 11-160620 | 6/1999 |
| JP | 2004-341238 | 12/2004 |
| JP | 2011-081065 | 4/2011 |
| JP | 2013-003176 | 1/2013 |
| JP | 2013-007878 | 1/2013 |

* cited by examiner

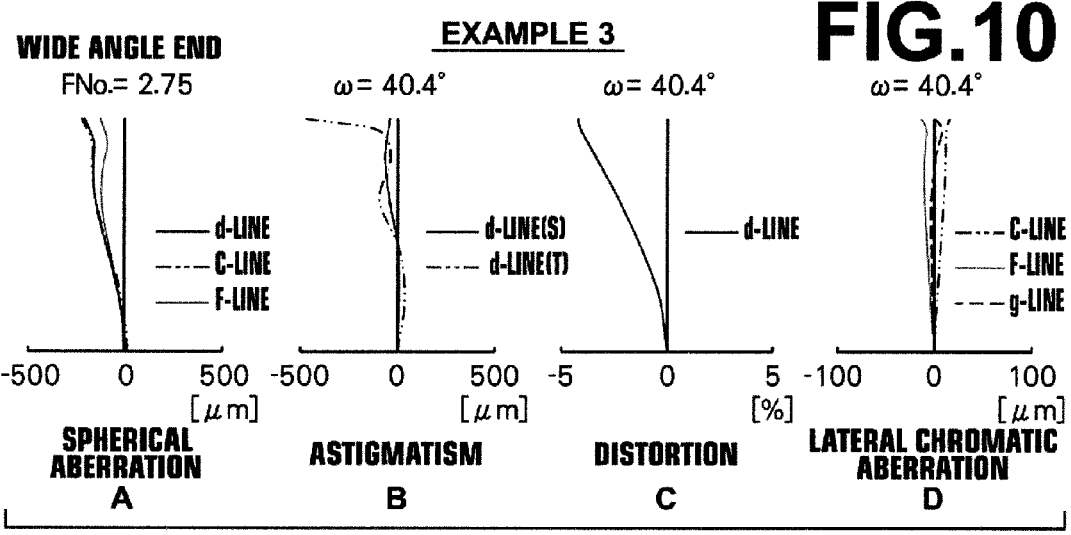
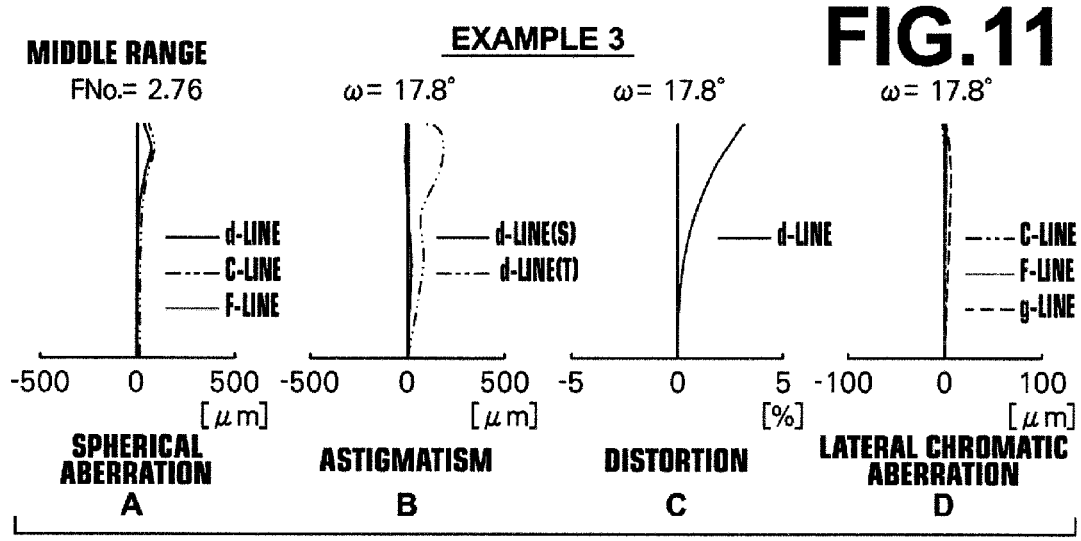
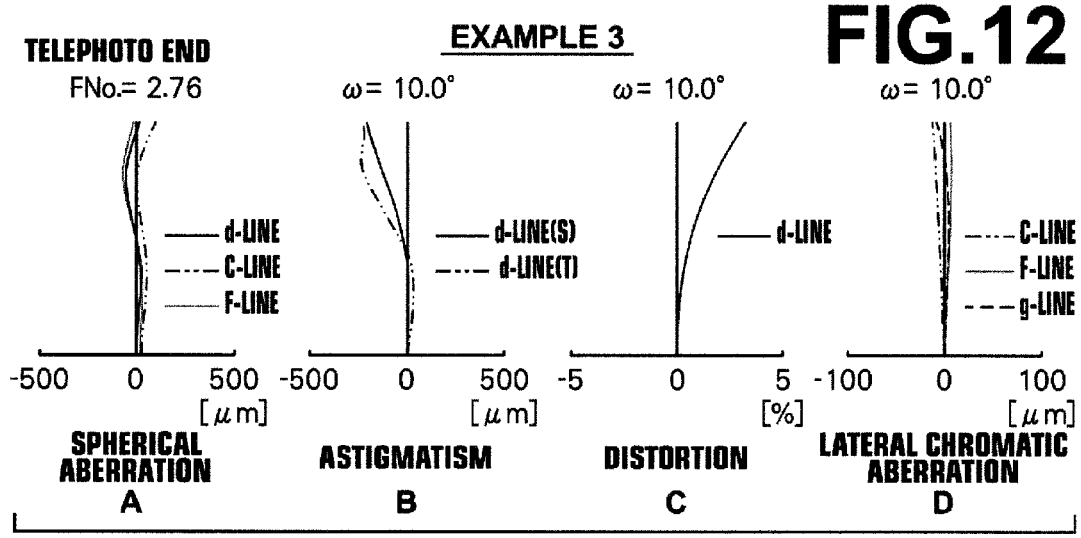

ZOOM LENS AND IMAGING APPARATUS

CROSS-REFERENCE TO RELATED APPLICATIONS

This application is a Continuation of PCT International Application No. PCT/JP2013/002356 filed on Apr. 5, 2013, which claims priority under 35 U.S.C. §119(a) to Japanese Patent Application No. 2012-088064 filed on Apr. 9, 2012. Each of the above applications is hereby expressly incorporated by reference, in its entirety, into the present application.

BACKGROUND OF THE INVENTION

1. Field of the Invention

The present invention relates to a zoom lens used in an electronic camera, such as a digital camera, a video camera, a camera for broadcasting, a camera for movies and a camera for surveillance, and also to an imaging apparatus on which the zoom lens is mounted.

2. Description of the Related Art

In electronic cameras, such as a camera for broadcasting and a camera for film-making, a fluctuation of an angle of view caused by focusing is not desirable. Therefore, as a zoom lens consisting of four lens groups of a first through fourth lens groups, a zoom lens in which the first lens group is divided into an 11th lens group having negative refractive power, a 12th lens group having positive refractive power and a 13th lens group having positive refractive power, and the 12th lens group is moved during focusing has been proposed (please refer to Japanese Unexamined Patent Publication No. 9(1997)-015501 (Patent Document 1) and Japanese Unexamined Patent Publication No. 10(1998)-062686 (Patent Document 2)). Further, as a zoom lens used in such an electronic camera, a zoom lens consisting of five groups has been proposed to increase the magnification ratio of the zoom lens (please refer to Japanese Unexamined Patent Publication No. 10(1998)-031157 (Patent Document 3)). Especially, in a camera for movies, a lens needs to have performance similar to an imaging lens for an HDTV (high definition television) camera or higher. As a lens satisfying such a need, for example, a lens disclosed in Japanese Unexamined Patent Publication No. 2004-341238 (Patent Document 4) has been proposed.

SUMMARY OF THE INVENTION

However, in all of the zoom lenses disclosed in Patent Documents 1 through 4, despite their image size that is not very large, it is difficult to say that the size of the first lens group is sufficiently reduced. Especially, in recent years, a demand for a portable-type lens for broadcasting increased, and a small-size light-weight lens relative to large image size became requested. Further, a constant F-number during magnification change is also requested. However, the F-number of the zoom lens disclosed in Patent Document 3 is not constant.

In view of the foregoing circumstances, it is an object of the present invention to provide a zoom lens in which an F-number is constant during magnification change, and which can achieve lighter weight and higher performance.

A zoom lens of the present invention consists of a first lens group having positive refractive power, and which is fixed during magnification change, a second lens group having negative refractive power, and which moves from an object side toward an image side while magnification is changed from a wide angle end to a telephoto end, a third lens group having negative refractive power, and which corrects movement of an image plane during magnification change, and a fourth lens group having positive refractive power, and which is fixed during magnification change and includes a stop, in this order from the object side.

The second lens group consists of a 2a-th lens group having negative refractive power and a 2b-th lens group having positive refractive power in this order from the object side, and a distance between the 2a-th lens group and the 2b-th lens group is changed during magnification change.

The third lens group moves in such a manner that a distance from the fourth lens group at the telephoto end is narrower than a distance from the fourth lens group at the wide angle end.

The following conditional formula (1) is satisfied:

$$5.0 < L/fw < 15.0 \quad (1)$$

where

L: a length from a most-object-side surface in the first lens group to the stop, and fw: a focal length at the wide angle end.

Further, the following conditional formula (1-1) or (1-2) may be satisfied:

$$7.0 < L/fw < 12.0 \quad (1\text{-}1); \text{ or}$$

$$8.0 < L/fw < 10.0 \quad (1\text{-}2).$$

The zoom lens of the present invention consists of four lens groups of the first lens group, the second lens group, the third lens group and the fourth lens group. However, the zoom lens may include a lens or lenses substantially without refractive power, an optical element, such as a stop and a cover glass, a mechanism part, such as a lens flange, a lens barrel, an imaging device and a hand shake blur correction mechanism, and the like besides the four lens groups.

In the present invention, the shape of a lens surface, such as a convex surface, a concave surface, a flat surface, biconcave, meniscus, biconvex, plano-convex and plano-concave, and the sign of refractive power of a lens, such as positive and negative, are considered in a paraxial region when an aspherical surface is included, unless otherwise mentioned. In the present invention, the sign of a curvature radius is positive when a surface shape is convex toward the object side, and negative when a surface shape is convex toward the image side.

In the zoom lens of the present invention, it is desirable that a point at which a distance between the 2a-th lens group and the 2b-th lens group is wider than a distance between the 2a-th lens group and the 2b-th lens group at the wide angle end is included in focal length between the wide angle end and the telephoto end.

In the zoom lens of the present invention, it is desirable that the first lens group consists of a 1a-th lens group having negative refractive power, and which is fixed during focusing, a 1b-th lens group having positive refractive power, and which moves during focusing, and a 1c-th lens group having positive refractive power, and which is fixed during focusing, in this order from the object side, and that the following conditional formula (2) is satisfied:

$$0.050 < fw/f1b < 0.200 \quad (2)$$

where fw: a focal length at the wide angle end, and f1b: a focal length of the 1b-th lens group.

Further, the following conditional formula (2-1) or (2-2) may be satisfied:

$$0.060 < fw/f1b < 0.150 \quad (2\text{-}1); \text{ or}$$

$$0.070 < fw/f1b < 0.100 \quad (2\text{-}2).$$

In the zoom lens of the present invention, it is desirable that the 1a-th lens group consists of a 1a1-st lens having a negative meniscus lens shape with its convex surface facing the object side, a 1a2-nd lens with its convex surface facing the object side, and the absolute value of the curvature radius of the convex surface of the 1a2-nd lens being smaller than the absolute value of the curvature radius of the other surface of the 1a2-nd lens, and the 1a2-nd lens including an aspherical surface shaped in such a manner that positive refractive power becomes stronger as a distance from an optical axis increases, and a cemented lens of a 1a3-rd lens having negative refractive power, and a concave surface of which faces the object side, and the absolute value of the curvature radius of the concave surface being smaller than the absolute value of the curvature radius of the other surface of the 1a3-rd lens, and a 1a4-th lens having positive refractive power, and a convex surface of which faces the image side, and the absolute value of the curvature radius of the convex surface of the 1a4-th lens being smaller than the absolute value of the curvature radius of the other surface of the 1a4-th lens, in this order from the object side.

In this case, it is desirable that the following conditional formula (3) is satisfied:

$$0.00 < \theta gF1a4 - \theta gF1a3 \quad (3), \text{where}$$

$\theta gF1a4$: a partial dispersion ratio of the 1a4-th lens with respect to g-line and F-line, and
$\theta gF1a3$: a partial dispersion ratio of the 1a3-rd lens with respect to g-line and F-line.

Further, in the zoom lens of the present invention, it is desirable that the 1b-th lens group consists of a cemented lens of a 1b1-st lens having negative refractive power, and a cemented surface of which is convex toward the object side, and a 1b2-nd lens having positive refractive power.

In the zoom lens of the present invention, it is desirable that the 2a-th lens group consists of a 2a1-st lens having a negative meniscus lens shape with its convex surface facing the object side and a 2a2-nd lens having a biconcave shape in this order from the object side, and that the 2b-th lens group consists of a cemented lens of a 2bp-th lens having a biconvex shape and a 2bn-th lens having negative refractive power, and a concave surface of which faces the object side, and the absolute value of the curvature radius of the concave surface of the 2bn-th lens being smaller than the absolute value of the curvature radius of the other surface of the 2bn-th lens, in this order from the object side.

In this case, it is desirable that the following conditional formula (4) is satisfied:

$$1.75 < N2a \quad (4), \text{where}$$

N2a: an average refractive index of the 2a-th lens group.
The following conditional formula (4-1) may be satisfied:

$$1.83 < N2a \quad (4-1).$$

In the zoom lens of the present invention, it is desirable that the following conditional formula (5) is satisfied:

$$20.0 < v2bn - v2bp \quad (5), \text{where}$$

v2bn: an Abbe number of the 2bn-th lens, and
v2bp: an Abbe number of the 2bp-th lens.

Further, in the zoom lens of the present invention, it is desirable that the third lens group consists of a cemented lens of a 3n-th lens having a biconcave shape and a 3p-th lens having positive refractive power, and a convex surface of which faces the object side, in this order from the object side.

In this case, it is desirable that the following conditional formula (6) is satisfied:

$$30.0 < v3n - v3p \quad (6), \text{where}$$

v3p: an Abbe number of 3p-th lens L3p, and
v3n: an Abbe number of 3n-th lens L3n.
The following conditional formula (6-1) may be satisfied:

$$40.0 < v3n - v3p \quad (6-1).$$

An imaging apparatus of the present invention includes the aforementioned zoom lens of the present invention mounted thereon.

According to the present invention, the zoom lens consists of a first lens group having positive refractive power, and which is fixed during magnification change, a second lens group having negative refractive power, and which moves from an object side toward an image side while magnification is changed from a wide angle end to a telephoto end, a third lens group having negative refractive power, and which corrects movement of an image plane during magnification change, and a fourth lens group having positive refractive power, and which is fixed during magnification change and includes a stop, in this order from the object side. Therefore, if no vignetting of axial rays occurs between the first lens group and the third lens group, it is possible to make an F-number constant during magnification change.

Further, the second lens group consists of a 2a-th lens group having negative refractive power and a 2b-th lens group having positive refractive power in this order from the object side, and a distance between the 2a-th lens group and the 2b-th lens group is changed during magnification change. Therefore, it is possible to correct a fluctuation of aberrations caused by magnification change. Accordingly, high quality images are obtainable.

The third lens group is moved in such a manner that a distance from the fourth lens group at the telephoto end is narrower than a distance from the fourth lens group at the wide angle end. Therefore, it is possible to provide a wide movement range of the second lens group at the telephoto end. Hence, it is possible to suppress the refractive power of the second lens group. Accordingly, it is possible to suppress a fluctuation of aberrations caused by magnification change.

Further, conditional formula (1) is satisfied. Therefore, it is possible to suppress a fluctuation of aberrations during magnification change, and to reduce the diameter of the first lens group. Hence, it is possible to reduce the weight of the lens.

The imaging apparatus of the present invention includes the zoom lens of the present invention. Therefore, the imaging apparatus is structurable in small size and with high performance. Further, excellent images are obtainable by using an imaging device.

BRIEF DESCRIPTION OF THE DRAWINGS

FIG. 10 is various aberration diagrams of the zoom lens in Example 3 at a wide angle end, and Section A shows a spherical aberration, and Section B shows astigmatism, and Section C shows distortion and Section D shows a lateral chromatic aberration;

FIG. 11 is various aberration diagrams of the zoom lens in Example 3 in a middle range, and Section A shows a spherical aberration, and Section B shows astigmatism, and Section C shows distortion and Section D shows a lateral chromatic aberration;

FIG. 12 is various aberration diagrams of the zoom lens in Example 3 at a telephoto end, and Section A shows a spherical aberration, and Section B shows astigmatism, and Section C shows distortion and Section D shows a lateral chromatic aberration.

DESCRIPTION OF THE PREFERRED EMBODIMENTS

Figure 1:
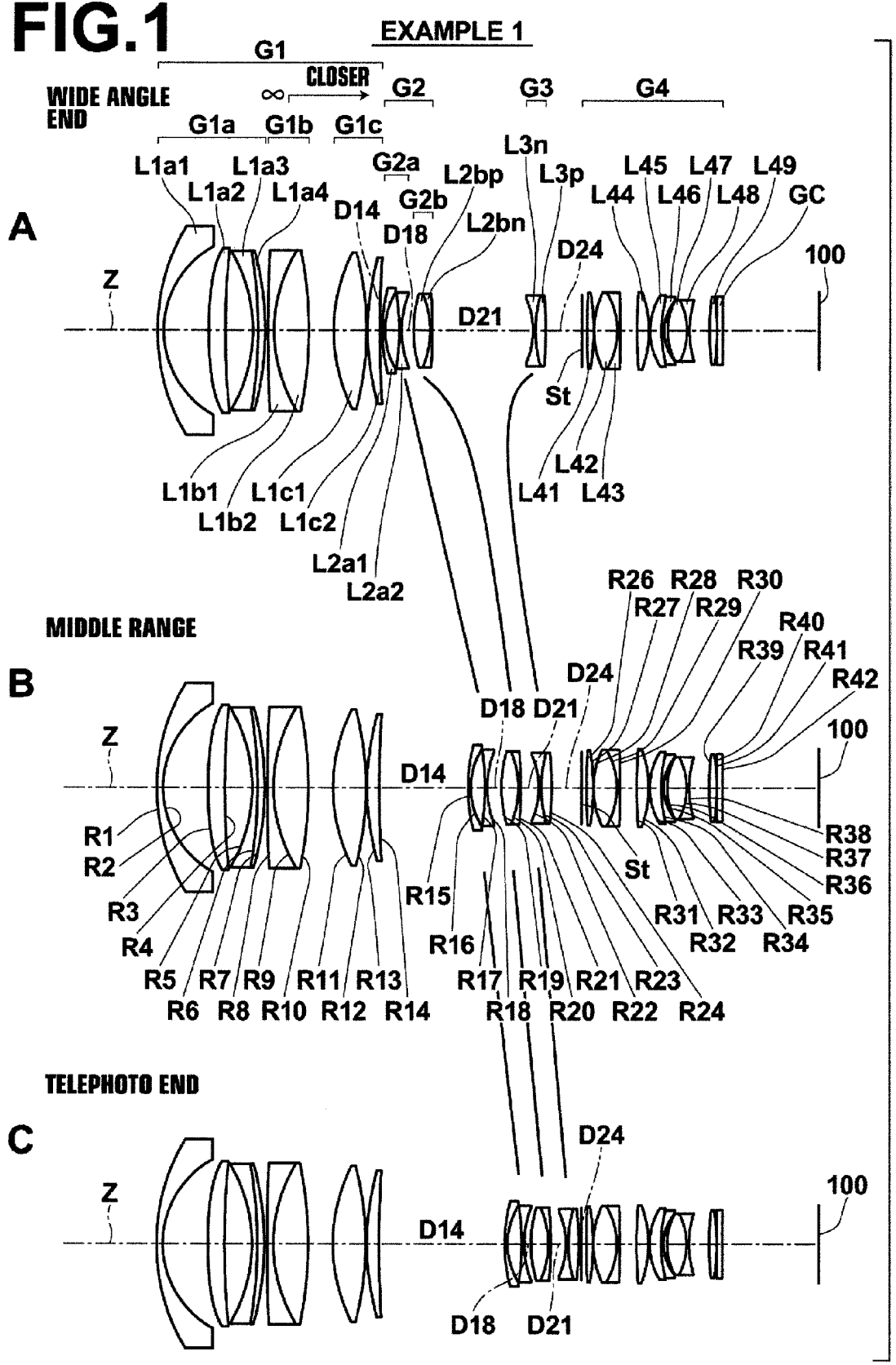
FIG. 1 is a diagram illustrating a first structure example of a zoom lens according to an embodiment of the present invention, and which is a lens cross section corresponding to Example 1.

Hereinafter, embodiments of the present invention will be described in detail with reference to drawings. FIG. 1, Sections A, B and C illustrate a first structure example of a zoom lens according to an embodiment of the present invention. This structure example corresponds to lens structure in Example 1, which will be described later. FIG. 1, Section A corresponds to arrangement of an optical system at a wide angle end (minimum focal length state). FIG. 1, Section B corresponds to arrangement of the optical system in a middle range (middle focal length state). FIG. 1, Section C corresponds to arrangement of the optical system at a telephoto end (maximum focal length state). Similarly, FIG. 2, Sections A, B and C and FIG. 3, Sections A, B and C illustrate second structure example and third structure example corresponding to lens structure in Examples 2 and 3, which will be described later. In FIG. 1, Sections A, B and C through FIG. 3, Sections A, B and C, sign Ri represents a curvature radius of an i-th surface when a most-object-side surface of composition elements is the first surface and the number of i sequentially increases toward an image side (image formation side). Sign Di represents a surface distance on optical axis Z between the i-th surface and the (i+1)th surface. Regarding sign Di, signs are assigned only to surface distances (D14, D18, D21 and D24) that change as magnification of photography is changed.

This zoom lens includes, along optical axis Z, first lens group G1 having positive refractive power, second lens group G2 having negative refractive power, third lens group G3 having negative refractive power, and fourth lens group G4 having positive refractive power in this order from the object side. It is desirable that optical aperture stop St is arranged toward the object side in fourth lens group G4.

Second lens group G2 consists of 2a-th lens group G2a having negative refractive power and 2b-th lens group G2b having positive refractive power in this order from the object side, and a distance between 2a-th lens group G2a and 2b-th lens group G2b is changed during magnification change. Further, a point at which a distance between 2a-th lens group G2a and 2b-th lens group G2b is wider than a distance between 2a-th lens group G2a and 2b-th lens group G2b at the wide angle end is included in focal length between the wide angle end and the telephoto end.

The zoom lens according to the embodiment of the present invention is mountable on photography equipment, for example, such as a single-lens mirrorless camera. An imaging device 100, such as a CCD (Charge Coupled Device) and a CMOS (Complementary Metal Oxide Semiconductor), is arranged at an image formation surface (imaging surface) of a camera on which this zoom lens is mounted. The imaging device 100 outputs imaging signals based on an optical image formed by the zoom lens according to the embodiment of the present invention. An imaging apparatus according to the embodiment of the present invention includes at least this zoom lens and the imaging device 100. Various kinds of optical member GC may be arranged between fourth lens group G4, which is the last lens group, and the imaging device 100 based on the structure of the camera side on which the lens is mounted. For example, a flat-plate-shaped optical member, such as a cover glass for protecting the imaging surface and an infrared-ray-cut filter, may be arranged. FIG. 1, Sections A, B and C through FIG. 3, Sections A, B and C illustrate also the imaging device 100 and optical member GC.

In this zoom lens, first lens group G1 and fourth lens group G4 are fixed during magnification change. The zoom lens is structured in such a manner that magnification is changed by changing distances between lens groups by moving second lens group G2 and third lens group G3 along optical axis Z. Specifically, as magnification is changed from a wide angle end to a middle range, and further to a telephoto end, second lens group G2 and third lens group G3 move in such a manner to draw paths indicated by solid lines in the diagrams, for example, from a state of FIG. 1, Section A to a state of FIG. 1, Section B, and further to a state of FIG. 1, Section C.

More specifically, while magnification is changed from a wide angle end state to a telephoto end state, a distance between first lens group G1 and second lens group G2 becomes wider. A distance between 2a-th lens group G2a and 2b-th lens group G2b becomes wider than a distance between 2a-th lens group G2a and 2b-th lens group G2b at the wide angle end, and after then, the distance becomes narrower. A distance between second lens group G2 and third lens group G3 becomes narrower, and a distance between third lens group G3 and fourth lens group G4 becomes narrower. Since the lens groups move in such a manner, each lens group can effectively change magnification.

The zoom lens according to the embodiment of the present invention adopts such structure. Therefore, if no vignetting of axial rays occurs between first lens group G1 and third lens group G3, it is possible to make F-number (FNo.) constant during magnification change.

Further, second lens group G2 consists of 2a-th lens group G2a having negative refractive power and 2b-th lens group G2b having positive refractive power in this order from the object side, and a distance between 2a-th lens group G2a and 2b-th lens group G2b is changed during magnification change. Therefore, it is possible to correct a fluctuation of aberrations caused by magnification change. Accordingly, high-quality images are obtainable. Especially, when magnification is changed, if a point at which a distance between 2a-th lens group G2a and 2b-th lens group G2b is wider than a distance between 2a-th lens group G2a and 2b-th lens group G2b at the wide angle end is included in focal length between the wide angle end and the telephoto end, it is possible to suppress a fluctuation of aberrations even more.

Third lens group G3 is moved in such a manner that a distance from fourth lens group G4 at the telephoto end is narrower than a distance from fourth lens group G4 at the wide angle end. Therefore, it is possible to provide a wide movement range of second lens group G2 at the telephoto end. Hence, it is possible to suppress the refractive power of second lens group G2. Accordingly, it is possible to suppress a fluctuation of aberrations caused by magnification change.

It is desirable that the zoom lens according to the embodiment of the present invention satisfies the following conditional formula (1):

$$5.0 < L/fw < 15.0 \quad (1),$$ where

L: a length from a most-object-side surface in first lens group G1 to the stop, and fw: a focal length at the wide angle end.

If the value is lower than the lower limit of conditional formula (1), a sufficient variable magnification ratio is not obtainable, or refractive power of second lens group G2 becomes excessive, and a fluctuation of aberrations during magnification change becomes large. If the value exceeds the upper limit of conditional formula (1), the diameter of first lens group G1 becomes large, and reduction of weight becomes difficult.

To further reduce a fluctuation of aberrations and to further reduce weight, it is desirable that the following conditional formula (1-1) is satisfied. It is more desirable that the following conditional formula (1-2) is satisfied:

$$7.0 < L/fw < 12.0 \quad (1\text{-}1); \text{ or}$$

$$8.0 < L/fw < 10.0 \quad (1\text{-}2).$$

It is desirable that first lens group G1 consists of 1a-th lens group G1a having negative refractive power, and which is fixed during focusing, 1b-th lens group G1b having positive refractive power, and which moves during focusing, and 1c-th lens group G1c having positive refractive power, and which is fixed during focusing, in this order from the object side. Further, 1b-th lens group G1b performs focusing by moving along optical axis Z while focusing is performed from an infinite distance object to a finite distance object. When first lens group G1 is structured in such a manner, it is possible to reduce a fluctuation of an angle of view during magnification change. Further, when 1a-th lens group G1a has negative refractive power, it is possible to reduce the lens diameter of first lens group G1.

In this case, it is desirable that the following conditional formula (2) is satisfied:

$$0.050 < fw/f1b < 0.200 \quad (2),$$ where fw: a focal length at the wide angle end, and f1b: a focal length of 1b-th lens group G1b.

If the value is lower than the lower limit of conditional formula (2), a movement amount of 1b-th lens group G1b during focusing becomes large, and a distance between 1a-th lens group G1a and 1c-th lens group G1c inevitably becomes wide. As a result, the diameter of 1a-th lens group G1a increases, and reduction of weight becomes difficult. If the value exceeds the upper limit of conditional formula (2), the refractive power of 1b-th lens group G1b becomes strong. Therefore, a movement amount during focusing becomes small. However, a fluctuation of aberrations becomes large when focus is changed based on a change in distance to an object.

To further reduce weight, and to further reduce a fluctuation of aberrations, it is desirable that the following conditional formula (2-1) is satisfied. It is more desirable that the following conditional formula (2-2) is satisfied:

$$0.060 < fw/f1b < 0.150 \quad (2\text{-}1); \text{ or}$$

$$0.070 < fw/f1b < 0.100 \quad (2\text{-}2).$$

In the embodiment of the present invention, it is desirable that 1a-th lens group G1a consists of 1a1-st lens L1a1 having a negative meniscus lens shape with its convex surface facing the object side, 1a2-nd lens L1a2 with its convex surface facing the object side, and the absolute value of the curvature radius of the convex surface of the 1a2-nd lens L1a2 being smaller than the absolute value of the curvature radius of the other surface of the 1a2-nd lens L1a2, and the 1a2-nd lens L1a2 including an aspherical surface shaped in such a manner that positive refractive power becomes stronger as a distance from optical axis Z increases, and a cemented lens of 1a3-rd lens L1a3 having negative refractive power, and a concave surface of which faces the object side, and the absolute value of the curvature radius of the concave surface being smaller than the absolute value of the curvature radius of the other surface of 1a3-rd lens L1a3, and 1a4-th lens L1a4 having positive refractive power, and a convex surface of which faces the image side, and the absolute value of the curvature radius of the convex surface of 1a4-th lens L1a4 being smaller than the absolute value of the curvature radius of the other surface of 1a4-th lens L1a4, in this order from the object side.

When 1a-th lens group G1a is structured in such a manner, 1a1-st lens L1a1, which has negative meniscus lens shape, can reduce angles between off-axial rays and optical axis Z. Accordingly, an angle of incidence of rays entering second lens group G2 is reduced, and it is possible to reduce a fluctuation of an angle of view and a fluctuation of aberrations in a peripheral part of the angle of view which are caused by focusing. Further, 1a2-nd lens L1a2, which has positive refractive power, can reduce distortion and a lateral chromatic aberration at a wide angle end. Further, an aspherical surface of 1a2-nd lens L1a2, which has positive refractive power, can reduce a fluctuation of aberrations in a peripheral part of the angle of view. Further, the cemented lens of 1a3-rd lens L1a3, which has negative refractive power, and 1a4-th lens L1a4, which has positive refractive power, can correct a spherical aberration and a longitudinal chromatic aberration at a telephoto end and a lateral chromatic aberration from a wide angle end through a telephoto end.

In this case, it is desirable that the following conditional formula (3) is satisfied:

$$0.00 < \theta gF1a4 - \theta gF1a3 \quad (3), \text{where}$$

θgF1a4: a partial dispersion ratio of 1a4-th lens L1a4 with respect to g-line and F-line, and
θgF1a3: a partial dispersion ratio of 1a3-rd lens L1a3 with respect to g-line and F-line.

When conditional formula (3) is satisfied, it is possible to effectively correct secondary chromatic aberrations.

Further, in the embodiment of the present invention, it is desirable that 1b-th lens group G1b consists of a cemented lens of 1b1-st lens L1b1 having negative refractive power, and a cemented surface of which is convex toward the object side, and 1b2-nd lens L1b2 having positive refractive power. When 1b-th lens group G1b is structured in this manner, it is possible to suppress a fluctuation of aberrations caused by focusing so that the fluctuation is small. Especially, when the cemented surface is arranged in this direction, it is possible to suppress a fluctuation of a lateral chromatic aberration and astigmatism during focusing.

In the embodiment of the present invention, it is desirable that 1c-th lens group G1c consists of two lenses of 1c1-st lens L1c1 and 1c2-nd lens L1c2, which have positive refractive power. When 1c-th lens group G1c is structured in this manner, it is possible to easily correct a spherical aberration at a telephoto end.

Further, in the embodiment of the present invention, it is desirable that 2a-th lens group G2a consists of 2a1-st lens L2a1 having a negative meniscus lens shape with its convex surface facing the object side and 2a2-nd lens L2a2 having a biconcave shape in this order from the object side. It is desirable that 2b-th lens group G2b consists of a cemented lens of 2bp-th lens L2bp having a biconvex shape and 2bn-th lens L2bn having negative refractive power, and a concave surface of which faces the object side, and the absolute value of the curvature radius of the concave surface of 2bn-th lens L2bn being smaller than the absolute value of the curvature radius of the other surface of 2bn-th lens L2bn, in this order from the object side. When 2a-th lens group G2a is structured in this manner, it is possible to easily correct curvature of field and a lateral chromatic aberration during magnification change.

In this case, it is desirable that the following conditional formula (4) is satisfied:

$$1.75 < N2a \quad (4), \text{where}$$

N2a: an average refractive index of 2a-th lens group G1a.

When the value is lower than the lower limit of conditional formula (4), a fluctuation of a spherical aberration and astigmatism during magnification change becomes large.

It is desirable that the following conditional formula (4-1) is satisfied to further prevent a fluctuation of a spherical aberration and astigmatism during magnification change.

$$1.83 < N2a \quad (4\text{-}1).$$

Further, it is desirable that the following conditional formula (5) is satisfied:

$$20.0 < \nu 2bn - \nu 2bp \quad (5), \text{where}$$

ν2bn: an Abbe number of 2bn-th lens L2bn, and
ν2bp: an Abbe number of 2bp-th lens L2bp.

If the value is lower than the lower limit of conditional formula, a longitudinal chromatic aberration and a lateral chromatic aberration are insufficiently corrected.

In the embodiment of the present invention, it is desirable that third lens group G3 consists of a cemented lens of 3n-th lens L3n having a biconcave shape and 3p-th lens L3p having positive refractive power, and a convex surface of which faces the object side, in this order from the object side. When third lens group G3 is structured in this manner, it is possible to easily correct a spherical aberration and a longitudinal chromatic aberration during magnification change.

In this case, it is desirable that the following conditional formula (6) is satisfied:

$$30.0 < \nu 3n - \nu 3p \quad (6), \text{where}$$

ν3p: an Abbe number of 3p-th lens L3p, and
ν3n: an Abbe number of 3p-th lens L3n.

When the value is lower than the lower limit of conditional formula (6), correction of a longitudinal chromatic aberration becomes difficult.

To more easily correct a longitudinal chromatic aberration, it is desirable that the following conditional formula (6-1) is satisfied:

$$40.0 < \nu 3n - \nu 3p \quad (6\text{-}1).$$

In the embodiment of the present invention, fourth lens group G4 consists of 4-1st lens L41 having positive refractive power, 4-2nd lens L42 having positive refractive power, 4-3rd lens L43 having negative refractive power, 4-4th lens L44 having positive refractive power, 4-5th lens L45 having positive refractive power, 4-6th lens L46 having negative refractive power, 4-7th lens L47 having positive refractive power, 4-8th lens L48 having negative refractive power, and 4-9th lens L49 having positive refractive power in this order from the object side. In the second and third examples, a cemented lens of 4-9th lens L49 and 4-10th lens L50 that has positive refractive power is used instead of 4-9th lens L49, which is a single lens, to structure fourth lens group G4.

[Example of Application to Imaging Apparatus]

Figure 13:
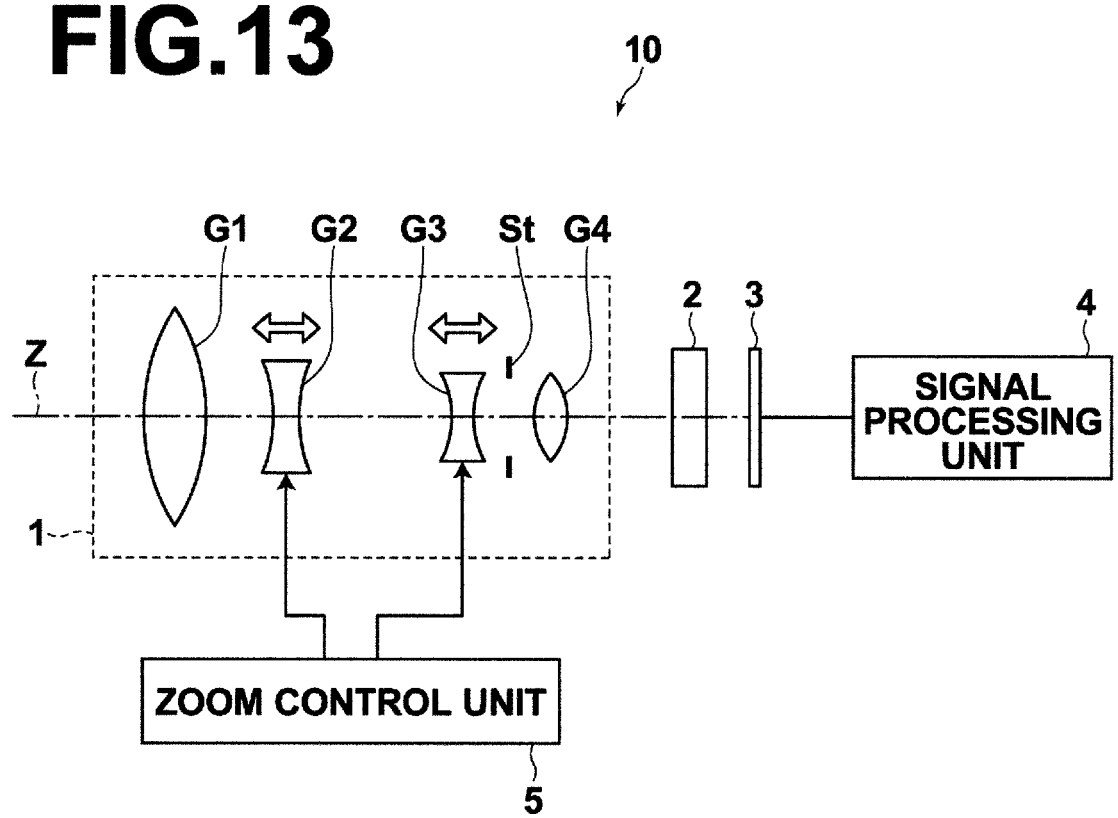
FIG. 13 is a schematic diagram illustrating the configuration of an imaging apparatus according to an embodiment of the present invention.

Next, an imaging apparatus according to an embodiment of the present invention will be described. FIG. 13 is a schematic diagram illustrating the configuration of an imaging apparatus using the zoom lens according to an embodiment of the present invention, as an example of the imaging apparatus according to an embodiment of the present invention. The imaging apparatus is, for example, a digital camera, a video camera, a camera for broadcasting, a camera for movies, a camera for surveillance or the like using an imaging device, such as a CCD and a CMOS.

An imaging apparatus 10, illustrated in FIG. 13, includes a zoom lens 1, a filter 2 arranged toward the image side of the zoom lens 1, an imaging device 3 for imaging an image of a subject formed by the zoom lens 1, a signal processing unit 4 for performing operation processing on an signal output from the imaging device 3, and a zoom control unit 5 for performing magnification change of the zoom lens 1 and focus adjustment necessitated by the magnification change.

The zoom lens 1 includes first lens group G1 having positive refractive power, and which is fixed during magnification change, second lens group G2 having negative refractive power, and which performs magnification change by moving along optical axis Z, third lens group G3 having negative refractive power, and which corrects movement of an image plane during magnification change, and fourth lens group G4 having positive refractive power, and which is fixed during magnification change and includes aperture stop St. In FIG. 13, each lens group is schematically illustrated. The imaging device 3 converts an optical image formed by the zoom lens 1 into electrical signals. An imaging surface of the imaging device 3 is arranged at the same position as an image plane of the zoom lens 1. As the imaging device, for example, a CCD, a CMOS and the like may be used.

When the zoom lens according the embodiment of the present invention is used as the zoom lens 1 in such an imaging apparatus, high-resolution imaging signals are obtainable.

EXAMPLES

Next, specific examples of the zoom lens according to the embodiment of the present invention will be described.

Example 1

FIG. 1, Sections A, B and C are diagrams illustrating the structure of the zoom lens in Example 1 of the present invention.

First lens group G1 of the zoom lens in Example 1 consists of 1a-th lens group G1a having negative refractive power, and which is fixed during focusing, 1b-th lens group G1b having positive refractive power, and which moves during focusing, and 1c-th lens group G1c having positive refractive power, and which is fixed during focusing, in this order from the object side.

Further, 1a-th lens group G1a consists of 1a1-st lens L1a1 having a negative meniscus lens shape with its convex surface facing the object side, 1a2-nd lens L1a2 having positive refractive power, and a convex surface of which faces the object side, and the absolute value of the curvature radius of the convex surface of 1a2-nd lens L1a2 being smaller than the absolute value of the curvature radius of the other surface of 1a2-nd lens L1a2, and a cemented lens of 1a3-rd lens L1a3 having negative refractive power, and a concave surface of which faces the object side, and the absolute value of the curvature radius of the concave surface being smaller than the absolute value of the curvature radius of the other surface of 1a3-rd lens L1a3, and 1a4-th lens L1a4 having positive refractive power, and a convex surface of which faces the image side, and the absolute value of the curvature radius of the convex surface of the 1a4-th lens L1a4 being smaller than the absolute value of the curvature radius of the other surface of 1a4-th lens L1a4, in this order from the object side. Here, surface R3, which is an object-side surface of 1a2-nd lens L1a2, is an aspherical surface shaped in such a manner that positive refractive power becomes stronger as a distance from optical axis Z increases.

Further, 1b-th lens group G1b consists of a cemented lens of 1b1-st lens L1b1 having negative refractive power, and a cemented surface of which is convex toward the object side, and 1b2-nd lens L1b2 having positive refractive power.

Further, 1c-th lens group G1c consists of two lenses of 1c1-st lens L1c1 and 1c2-nd lens L1c2, which have positive refractive power. Surface R13, which is an object-side surface of 1c2-nd lens L1c2, is aspherical.

Second lens group G2 consists of 2a-th lens group G2a having negative refractive power and 2b-th lens group G2b having positive refractive power in this order from the object side. Further, 2a-th lens group G2a consists of 2a1-st lens L2a1 having a negative meniscus lens shape with its convex surface facing the object side and 2a2-nd lens L2a2 having a biconcave shape in this order from the object side. Further, 2b-th lens group G2b consists of a cemented lens of 2bp-th lens L2bp having a biconvex shape and 2bn-th lens L2bn having negative refractive power, and a concave surface of which faces the object side, and the absolute value of the curvature radius of the concave surface of 2bn-th lens L2bn being smaller than the absolute value of the curvature radius of the other surface of 2bn-th lens L2bn, in this order from the object side.

Third lens group G3 consists of a cemented lens of 3n-th lens L3n having a biconcave shape and 3p-th lens L3p having positive refractive power, and a convex surface of which faces the object side, in this order from the object side.

Fourth lens group G4 consists of 4-1st lens L41 having positive refractive power, 4-2nd lens L42 having positive refractive power, 4-3rd lens L43 having negative refractive power, 4-4th lens L44 having positive refractive power, 4-5th lens L45 having positive refractive power, 4-6th lens L46 having negative refractive power, 4-7th lens L47 having positive refractive power, 4-8th lens L48 having negative refractive power, and 4-9th lens L49 having positive refractive power in this order from the object side.

Table 1 and Table 2 show specific lens data corresponding to the structure of the zoom lens illustrated in FIG. 1, Sections A, B and C. Table 1 shows basic lens data, and Table 2 shows other data. In the lens data shown in Table 1, the column of surface number Si shows surface numbers assigned to i-th (i=1 through 42) surfaces of the zoom lens in Example 1. The most-object-side surface of composition elements is the first surface, and the surface numbers sequentially increase toward the image side. The column of curvature radius Ri shows a value (mm) of the curvature radius of the i-th surface from the object side, which corresponds to sign Ri provided in FIG. 1, Section B. Similarly, the column of surface distance Di shows a distance (mm), on an optical axis, between i-th surface Si and (i+1)th surface Si+1 from the object side. The column of Ndj shows the refractive index of a j-th (j=1, 2, 3, . . . ) optical element for d-line (wavelength is 587.6 nm) when the most-object-side lens is the first optical element, and the value of j sequentially increases toward the image side. Further, the column of νdj shows the Abbe number of the j-th optical element for d-line. Further, Table 2 shows, as other data, values of zoom ratios, paraxial focal length f (mm), back focus Bf, F-number (FNo.), and an angle of view (2ω) of the entire system at a wide angle end, in a middle range, and at a telephoto end in a state of focusing at infinity.

In the zoom lens of Example 1, a distance between first lens group G1 and second lens group G2, a distance between 2a-th lens group G2a and 2b-th lens group G2b, a distance between second lens group G2 and third lens group G3, and a distance between third lens group G3 and fourth lens group G4 change as magnification is changed. Therefore, distance D14 between first lens group G1 and second lens group G2, distance D18 between 2a-th lens group G2a and 2b-th lens group G2b, distance D21 between second lens group G2 and third lens group G3 and distance D24 between third lens group G3 and fourth lens group G4 are variable. Table 2 shows, as data of surface distances D14, D18, D21 and D24 during magnification change, zoom distances (mm) at a wide angle end, in a middle range, and at a telephoto end in a state of focusing at infinity.

In the lens data of Table 1, mark "*" attached to the left side of a surface number represents that a lens surface with the surface number is an aspherical surface. The basic lens data in Table 1 show, as the curvature radii of aspherical surfaces, numerical values of paraxial curvature radii.

Table 3 shows aspherical surface data in the zoom lens of Example 1. In numerical values representing aspherical surface data, the sign "E" means that a numerical value following the sign "E" is an "exponent" when a base is 10, and that a numerical value before the sign "E" is multiplied by a numerical value represented by an exponential function using 10, as the base. For example, "1.0E-02" means "$1.0 \times 10^{-2}$".

Table 3 shows aspherical surface data of the zoom lens in Example 1. Here, surface numbers of aspherical surfaces, and aspherical surface coefficients about the aspherical surfaces are shown. In the numerical value of an aspherical surface coefficient, "E-n" (n: integer) means "×10$^{-n}$". The aspherical surface coefficients are values of coefficients KA, Am in the following aspherical surface equation.

$$Zd = C \cdot h^2 / \{1 + (1 - KA \cdot C^2 \cdot h^2)^{1/2}\} + \Sigma Am \cdot h^m, \text{ where}$$

Zd: the depth of an aspherical surface (the length of a perpendicular from a point on the aspherical surface at height h to a flat plane that contacts with the vertex of the aspherical surface and is perpendicular to the optical axis), h: height (a length from the optical axis to the lens surface), C: a reciprocal of a paraxial curvature radius, and KA, Am: aspherical surface coefficients.

The aspherical surfaces of the zoom lens in Example 1 are based on the aspherical surface equation. Aspherical surface coefficient Am represents A4 through A20 by effectively using orders of even numbers.

Examples 2 and 3

Figure 2:
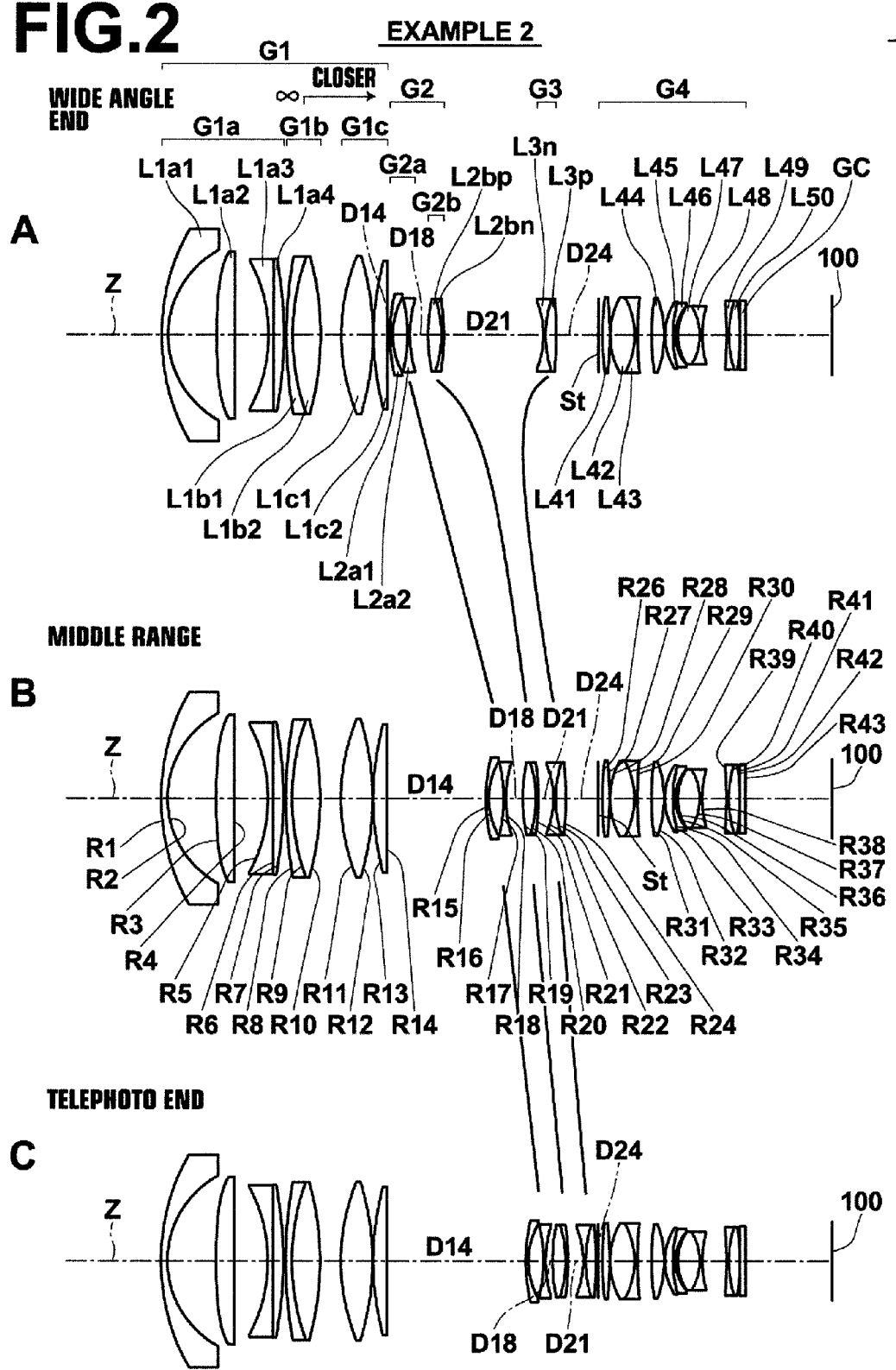
FIG. 2 is a diagram illustrating a second structure example of the zoom lens, and which is a lens cross section corresponding to Example 2.
Figure 3:
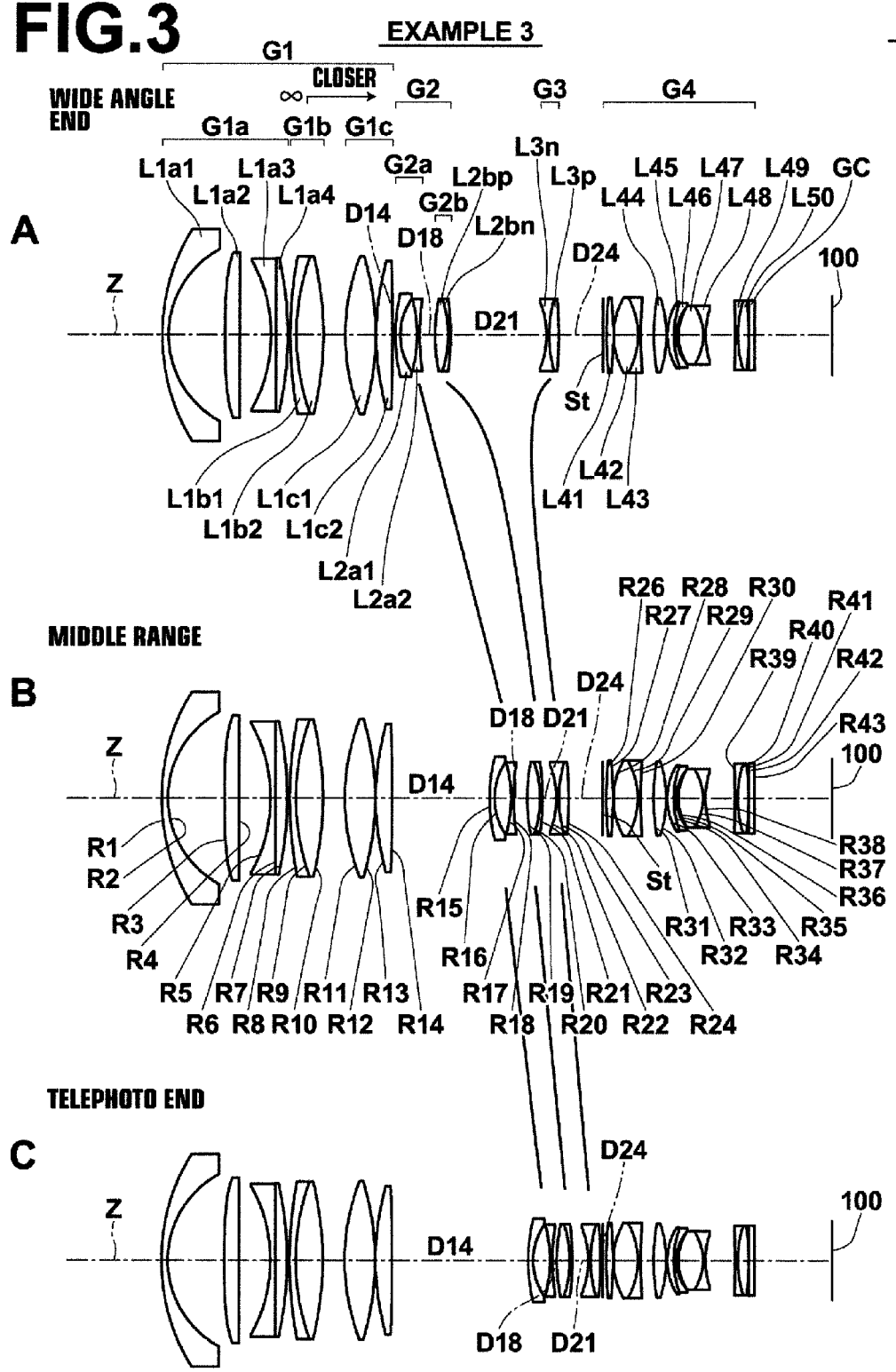
FIG. 3 is a diagram illustrating a third structure example of the zoom lens, and which is a lens cross section corresponding to Example 3.

FIG. 2, Sections A, B and C are diagrams illustrating the structure of the zoom lens in Example 2 of the present invention. FIG. 3, Sections A, B and C are diagrams illustrating the structure of the zoom lens in Example 3 of the present invention. The zoom lenses in Examples 2 and 3 are structured substantially in a similar manner to the zoom lens in Example 1. However, a lens closest to an image plane in fourth lens group G4 is different from Example 1. Instead of 4-9th lens L49, which has positive refractive power, a cemented lens of 4-9th lens L49 having negative refractive power and 4-10th lens L50 having positive refractive power is used. Consequently, surface numbers of lenses located toward the image side of 4-8th lens L48 are shifted by 1 from those of Example 1.

Tables 4 through 6 show specific lens data of the zoom lens in Example 2 in a similar manner to Example 1, as described above. Further, Tables 7 through 9 show specific lens data of the zoom lens in Example 3. In the zoom lens of Example 3, surface R15, which is an object-side surface of negative meniscus lens L2a1 in 2a-th lens group G1a, is aspherical in addition to surface R3 and surface R13.

TABLE 1

EXAMPLE 1·LENS DATA

| Si | Ri | Di | Ndj | vdj | θg, f |
|---|---|---|---|---|---|
| 1 | 83.6753 | 2.650 | 1.77250 | 49.60 | 0.55212 |
| 2 | 39.7706 | 18.534 | | | |
| *3 | 200.9650 | 6.719 | 1.53172 | 48.84 | 0.56309 |
| 4 | 333.8989 | 11.201 | | | |
| 5 | −65.0622 | 2.200 | 1.81600 | 46.62 | 0.55682 |
| 6 | −192.5200 | 3.019 | 1.58144 | 40.75 | 0.57757 |
| 7 | −120.9903 | 1.150 | | | |
| 8 | 867.6891 | 2.500 | 1.62588 | 35.70 | 0.58935 |
| 9 | 62.7766 | 14.394 | 1.59522 | 67.73 | 0.54426 |
| 10 | −166.9668 | 10.239 | | | |
| 11 | 71.2997 | 13.494 | 1.49700 | 81.54 | 0.53748 |
| 12 | −126.3081 | 0.300 | | | |
| *13 | 95.8037 | 5.000 | 1.64000 | 60.08 | 0.53704 |
| 14 | 446.4611 | DD[14] | | | |
| 15 | 69.0580 | 1.200 | 2.00100 | 29.13 | 0.59952 |
| 16 | 30.4765 | 5.858 | | | |
| 17 | −96.8170 | 1.000 | 1.75500 | 52.32 | 0.54765 |
| 18 | 41.5973 | DD[18] | | | |
| 19 | 53.3289 | 6.953 | 1.64769 | 33.79 | 0.59393 |
| 20 | −37.9590 | 1.000 | 1.65160 | 58.55 | 0.54267 |
| 21 | −188.1123 | DD[21] | | | |
| 22 | −33.4301 | 1.000 | 1.59522 | 67.73 | 0.54426 |
| 23 | 53.5105 | 4.165 | 1.80518 | 25.42 | 0.61616 |
| 24 | −153.1250 | DD[24] | | | |

TABLE 1-continued

EXAMPLE 1·LENS DATA

| Si | Ri | Di | Ndj | vdj | θg, f |
|---|---|---|---|---|---|
| 25(STOP) | ∞ | 2.105 | | | |
| 26 | 325.2749 | 2.838 | 1.80400 | 46.58 | 0.55730 |
| 27 | −91.0078 | 0.100 | | | |
| 28 | 37.6232 | 9.549 | 1.49700 | 81.54 | 0.53748 |
| 29 | −30.7687 | 1.201 | 1.88300 | 40.76 | 0.56679 |
| 30 | −1079.3514 | 7.036 | | | |
| 31 | 192.5100 | 4.944 | 1.68853 | 52.42 | 0.55215 |
| 32 | −44.6675 | 0.425 | | | |
| 33 | 27.2974 | 4.858 | 1.56384 | 60.83 | 0.54082 |
| 34 | 57.9469 | 1.000 | 1.56732 | 42.82 | 0.57309 |
| 35 | 19.7636 | 1.444 | | | |
| 36 | 27.1072 | 8.013 | 1.43875 | 94.94 | 0.53433 |
| 37 | −27.1072 | 1.000 | 1.90366 | 31.31 | 0.59481 |
| 38 | 41.8199 | 8.211 | | | |
| 39 | 122.9287 | 3.041 | 1.67003 | 47.23 | 0.56276 |
| 40 | −89.9208 | 0.000 | | | |
| 41 | ∞ | 2.300 | 1.51633 | 64.14 | 0.53531 |
| 42 | ∞ | 40.029 | | | |

TABLE 2

EXAMPLE 1·OTHER DATA

| | WIDE ANGLE END | MIDDLE RANGE | TELEPHOTO END |
|---|---|---|---|
| ZOOM RATIO | 1.00 | 2.46 | 4.48 |
| f | 19.619 | 48.263 | 87.894 |
| Bf | 40.029 | 40.029 | 40.029 |
| FNo. | 2.75 | 2.75 | 2.75 |
| 2ω[°] | 80.8 | 35.4 | 20.0 |
| DD[14] | 1.000 | 36.754 | 52.066 |
| DD[18] | 4.889 | 5.810 | 2.789 |
| DD[21] | 41.525 | 7.393 | 6.203 |
| DD[24] | 14.800 | 12.258 | 1.156 |

TABLE 3

EXAMPLE 1·ASPHERICAL SURFACE COEFFICIENT

| SURFACE NUMBER | 3 | 13 |
|---|---|---|
| KA | 1.00000000E+00 | 1.00000000E+00 |
| A4 | 1.36200003E−06 | −6.69420557E−07 |
| A6 | 4.30246648E−10 | −1.11177947E−10 |
| A8 | −3.39244067E−14 | −2.27394283E−13 |
| A10 | 4.13032511E−17 | 3.46491720E−16 |
| A12 | 1.32820793E−19 | −3.80989001E−19 |
| A14 | 1.08672308E−22 | 1.85223282E−22 |
| A16 | −2.20434179E−25 | 1.00247579E−25 |
| A18 | 7.64994118E−29 | −2.25580977E−28 |
| A20 | 1.65535971E−32 | 1.02598042E−31 |

TABLE 4

EXAMPLE 2·LENS DATA

| Si | Ri | Di | Ndj | vdj | θg, f |
|---|---|---|---|---|---|
| 1 | 87.7265 | 2.650 | 1.77250 | 49.60 | 0.55212 |
| 2 | 39.4475 | 19.796 | | | |
| *3 | 259.8532 | 7.679 | 1.57250 | 57.74 | 0.54568 |
| 4 | ∞ | 13.558 | | | |
| 5 | −62.9961 | 2.100 | 1.81600 | 46.62 | 0.55682 |
| 6 | ∞ | 4.148 | 1.76182 | 26.52 | 0.61361 |
| 7 | −167.4099 | 1.000 | | | |
| 8 | 182.7134 | 2.500 | 1.80809 | 22.76 | 0.63073 |
| 9 | 96.2850 | 11.263 | 1.43875 | 94.94 | 0.53433 |
| 10 | −120.7442 | 8.461 | | | |

TABLE 4-continued

EXAMPLE 2·LENS DATA

| Si | Ri | Di | Ndj | vdj | θg, f |
|---|---|---|---|---|---|
| 11 | 84.8265 | 12.981 | 1.43875 | 94.94 | 0.53433 |
| 12 | −105.7606 | 0.150 | | | |
| *13 | 104.3261 | 5.789 | 1.72916 | 54.68 | 0.54451 |
| 14 | ∞ | DD[14] | | | |
| 15 | 73.2706 | 1.100 | 2.00330 | 28.27 | 0.59802 |
| 16 | 30.7124 | 6.080 | | | |
| 17 | −62.5157 | 1.000 | 1.72916 | 54.68 | 0.54451 |
| 18 | 51.9463 | DD[18] | | | |
| 19 | 71.4300 | 5.423 | 1.63980 | 34.47 | 0.59233 |
| 20 | −45.8340 | 1.010 | 1.49700 | 81.54 | 0.53748 |
| 21 | −98.0512 | DD[21] | | | |
| 22 | −36.7033 | 1.000 | 1.59522 | 67.73 | 0.54426 |
| 23 | 49.0120 | 4.100 | 1.84139 | 24.56 | 0.61274 |
| 24 | −206.8689 | DD[24] | | | |
| 25(STOP) | ∞ | 1.648 | | | |
| 26 | 134.9290 | 2.951 | 1.80000 | 29.84 | 0.60178 |
| 27 | −134.9290 | 0.100 | | | |
| 28 | 31.2660 | 9.999 | 1.49700 | 81.54 | 0.53748 |
| 29 | −31.2660 | 1.200 | 1.88300 | 40.76 | 0.56679 |
| 30 | 166.4220 | 5.563 | | | |
| 31 | 110.0345 | 5.160 | 1.69680 | 55.53 | 0.54341 |
| 32 | −42.7584 | 0.300 | | | |
| 33 | 25.2737 | 3.321 | 1.58913 | 61.13 | 0.54067 |
| 34 | 49.5150 | 1.000 | 1.78472 | 25.68 | 0.61621 |
| 35 | 18.2974 | 0.998 | | | |
| 36 | 22.1360 | 8.917 | 1.49700 | 81.54 | 0.53748 |
| 37 | −22.1360 | 1.000 | 1.90366 | 31.31 | 0.59481 |
| 38 | 40.9045 | 9.912 | | | |
| 39 | −168.2973 | 1.010 | 1.51742 | 52.43 | 0.55649 |
| 40 | 46.5390 | 4.553 | 1.80518 | 25.42 | 0.61616 |
| 41 | −92.1790 | 0.000 | | | |
| 42 | ∞ | 2.300 | 1.51633 | 64.14 | 0.53531 |
| 43 | ∞ | 35.194 | | | |

TABLE 5

EXAMPLE 2·OTHER DATA

| | WIDE ANGLE END | MIDDLE RANGE | TELEPHOTO END |
|---|---|---|---|
| ZOOM RATIO | 1.00 | 2.46 | 4.48 |
| f | 19.633 | 48.296 | 87.954 |
| Bf | 35.192 | 35.192 | 35.192 |
| FNo. | 2.75 | 2.76 | 2.76 |
| 2ω[°] | 80.8 | 35.6 | 20.0 |
| DD[14] | 1.000 | 40.176 | 56.302 |
| DD[18] | 7.473 | 6.719 | 2.682 |
| DD[21] | 40.321 | 6.031 | 6.172 |
| DD[24] | 17.449 | 13.317 | 1.088 |

TABLE 6

EXAMPLE 2·ASPHERICAL SURFACE COEFFICIENT

| SURFACE NUMBER | 3 | 13 |
|---|---|---|
| KA | 1.00000000E+00 | 1.00000000E+00 |
| A4 | 1.35652710E−06 | −4.80627870E−07 |
| A6 | 1.70918770E−10 | 4.18286060E−12 |
| A8 | 4.18252660E−13 | −2.17218840E−13 |
| A10 | −3.26780340E−16 | 3.53789520E−16 |
| A12 | 3.13196540E−19 | −4.28273820E−19 |
| A14 | −8.46351300E−23 | 2.39421800E−22 |
| A16 | −5.38605470E−26 | 8.51806380E−26 |
| A18 | 6.23522360E−29 | −2.00274120E−28 |
| A20 | −1.70757640E−33 | 8.06754520E−32 |

TABLE 7

EXAMPLE 3·LENS DATA

| Si | Ri | Di | Ndj | vdj | θg, f |
|---|---|---|---|---|---|
| 1 | 81.8911 | 2.650 | 1.77250 | 49.60 | 0.55212 |
| 2 | 39.8915 | 22.863 | | | |
| *3 | 525.1702 | 6.044 | 1.57250 | 57.74 | 0.54568 |
| 4 | ∞ | 12.733 | | | |
| 5 | −62.0749 | 2.100 | 1.81600 | 46.62 | 0.55682 |
| 6 | ∞ | 4.719 | 1.76182 | 26.52 | 0.61361 |
| 7 | −141.4003 | 1.000 | | | |
| 8 | 170.8462 | 2.500 | 1.80809 | 22.76 | 0.63073 |
| 9 | 92.0108 | 11.180 | 1.43875 | 94.94 | 0.53433 |
| 10 | −131.5114 | 8.942 | | | |
| 11 | 87.7510 | 12.337 | 1.43875 | 94.94 | 0.53433 |
| 12 | −112.7410 | 0.150 | | | |
| *13 | 100.5681 | 6.761 | 1.65160 | 58.55 | 0.54267 |
| 14 | −765.6939 | DD[14] | | | |
| *15 | 67.3314 | 2.100 | 2.00100 | 29.13 | 0.59952 |
| 16 | 26.4302 | 6.719 | | | |
| 17 | −56.4625 | 1.000 | 1.80400 | 46.58 | 0.55730 |
| 18 | 94.5645 | DD[18] | | | |
| 19 | 76.3950 | 5.250 | 1.68893 | 31.07 | 0.60041 |
| 20 | −46.7669 | 1.010 | 1.49700 | 81.54 | 0.53748 |
| 21 | −106.2961 | DD[21] | | | |
| 22 | −36.2098 | 1.000 | 1.59522 | 67.73 | 0.54426 |
| 23 | 53.4047 | 3.915 | 1.84139 | 24.56 | 0.61274 |
| 24 | −184.5948 | DD[24] | | | |
| 25(STOP) | ∞ | 1.380 | | | |
| 26 | 141.2707 | 2.820 | 1.80000 | 29.84 | 0.60178 |
| 27 | −141.2707 | 0.100 | | | |
| 28 | 31.1616 | 9.958 | 1.49700 | 81.54 | 0.53748 |
| 29 | −31.1616 | 1.200 | 1.88300 | 40.76 | 0.56679 |
| 30 | 199.5864 | 5.402 | | | |
| 31 | 92.2688 | 5.230 | 1.69680 | 55.53 | 0.54341 |
| 32 | −44.8336 | 0.300 | | | |
| 33 | 25.4212 | 2.732 | 1.58913 | 61.13 | 0.54067 |
| 34 | 39.3458 | 1.000 | 1.78472 | 25.68 | 0.61621 |
| 35 | 18.2157 | 0.884 | | | |
| 36 | 21.7832 | 10.043 | 1.49700 | 81.54 | 0.53748 |
| 37 | −21.7832 | 1.000 | 1.90366 | 31.31 | 0.59481 |
| 38 | 37.3385 | 12.025 | | | |
| 39 | −350.4870 | 1.010 | 1.51742 | 52.43 | 0.55649 |
| 40 | 47.0193 | 4.444 | 1.80518 | 25.43 | 0.61027 |
| 41 | −109.5815 | 0.000 | | | |
| 42 | ∞ | 2.300 | 1.51633 | 64.14 | 0.53531 |
| 43 | ∞ | 31.764 | | | |

TABLE 8

EXAMPLE 3·OTHER DATA

| | WIDE ANGLE END | MIDDLE RANGE | TELEPHOTO END |
|---|---|---|---|
| ZOOM RATIO | 1.00 | 2.46 | 4.48 |
| f | 19.619 | 48.263 | 87.893 |
| Bf | 31.766 | 31.766 | 31.766 |
| FNo. | 2.75 | 2.76 | 2.76 |
| 2ω[°] | 80.8 | 35.6 | 20.0 |
| DD[14] | 1.000 | 39.511 | 55.306 |
| DD[18] | 6.384 | 5.545 | 1.795 |
| DD[21] | 39.153 | 5.598 | 6.448 |
| DD[24] | 18.058 | 13.940 | 1.045 |

TABLE 9

EXAMPLE 3·ASPHERICAL SURFACE COEFFICIENT

| SURFACE NUMBER | | |
|---|---|---|
| 3 | 13 | 15 |
| KA 1.00000000E+00 | 1.00000000E+00 | 1.00000000E+00 |
| A4 1.13397451E−06 | −5.04670144E−07 | −6.69679656E−07 |

TABLE 9-continued

EXAMPLE 3·ASPHERICAL SURFACE COEFFICIENT

| | SURFACE NUMBER | | |
|---|---|---|---|
| | 3 | 13 | 15 |
| A6 | 4.24718352E−10 | −5.77245203E−11 | 3.54568637E−09 |
| A8 | −2.41800065E−14 | −1.54165754E−13 | −2.15386107E−11 |
| A10 | 1.70863436E−17 | 3.51772564E−16 | 3.91878439E−14 |
| A12 | −2.39771473E−19 | −4.57941659E−19 | 1.13279437E−17 |
| A14 | 8.85271470E−22 | 2.45816824E−22 | −7.06078849E−20 |
| A16 | −8.20573666E−25 | 1.01596368E−25 | −8.62489621E−24 |
| A18 | 2.23759744E−28 | −2.04573824E−28 | 1.18045106E−25 |
| A20 | 3.17607510E−32 | 7.72927810E−32 | −8.16369237E−28 |

[Other Numerical Data of Each Example]

Table 10 collectively shows values about each of the aforementioned conditional formulas for each example. As Table 10 shows, values about conditional formulas (1) through (6) in each example are within the ranges of numerical values of the conditional formulas.

TABLE 10

| FORMULA NUMBER | CONDITIONAL FORMULA | EXAMPLE 1 | EXAMPLE 2 | EXAMPLE 3 |
|---|---|---|---|---|
| (1) | L/fw | 9.489246 | 9.551299 | 9.659021 |
| (2) | fw/f1b | 0.074298 | 0.082531 | 0.079212 |
| (3) | θ gF1a4 − θ gF1a3 | 0.020705 | 0.05689 | 0.05689 |
| (4) | N2a | 1.878 | 1.86623 | 1.9025 |
| (5) | ν 2bn − ν 2bp | 24.76 | 47.07 | 50.47 |
| (6) | ν 3p − ν 3n | 42.31 | 43.17 | 43.17 |

[Aberration Performance]

Figure 4:
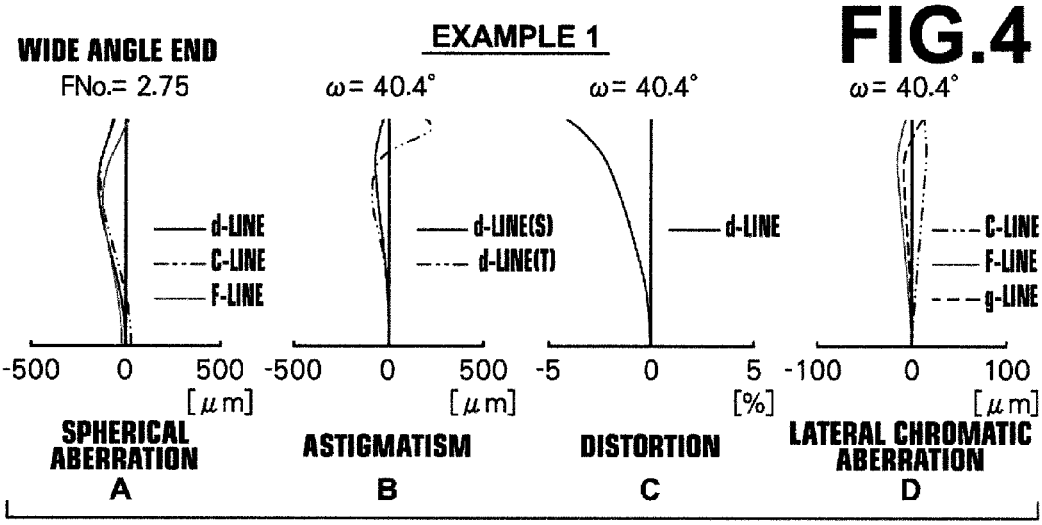
FIG. 4 is various aberration diagrams of the zoom lens in Example 1 at a wide angle end, and Section A shows a spherical aberration, and Section B shows astigmatism, and Section C shows distortion and Section D shows a lateral chromatic aberration.
Figure 5:
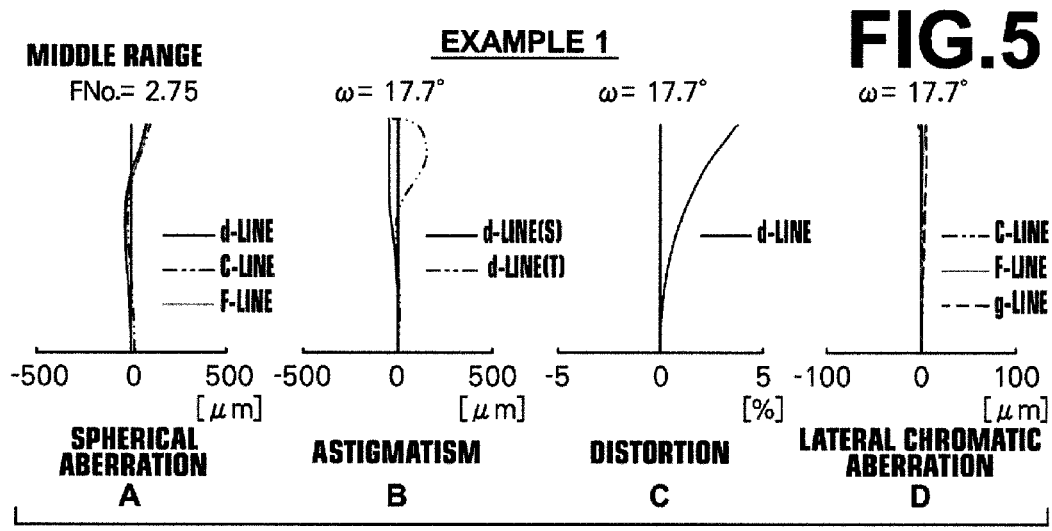
FIG. 5 is various aberration diagrams of the zoom lens in Example 1 in a middle range, and Section A shows a spherical aberration, and Section B shows astigmatism, and Section C shows distortion and Section D shows a lateral chromatic aberration.
Figure 6:
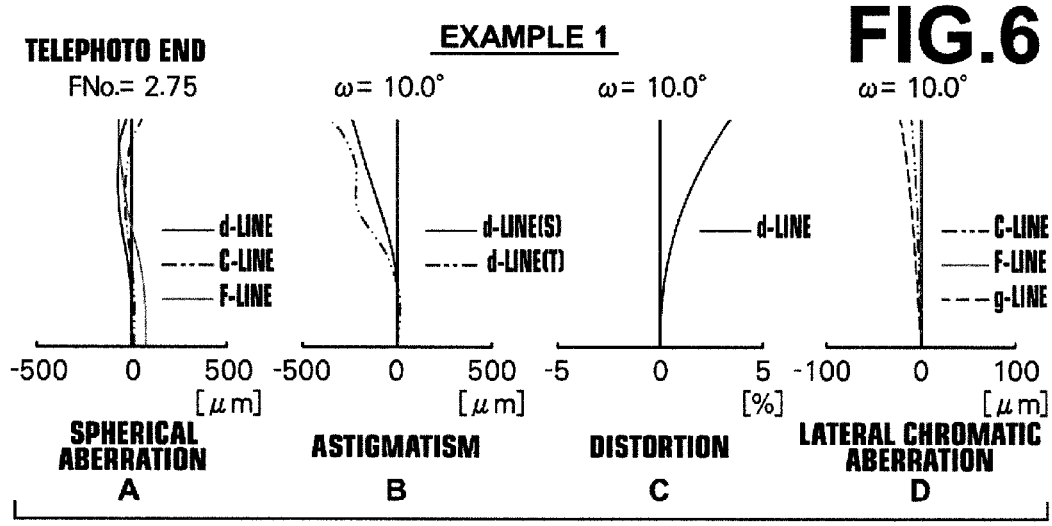
FIG. 6 is various aberration diagrams of the zoom lens in Example 1 at a telephoto end, and Section A shows a spherical aberration, and Section B shows astigmatism, and Section C shows distortion and Section D shows a lateral chromatic aberration.

FIG. 4, Sections A through D illustrate a spherical aberration, astigmatism, distortion and a lateral chromatic aberration of the zoom lens in Example 1 at a wide angle end. FIG. 5, Sections A through D illustrate similar aberrations in a middle range, and FIG. 6, Sections A through D illustrate similar aberrations at a telephoto end. Each aberration diagram illustrates an aberration when d-line (wavelength 587.6 nm) is a reference wavelength. In a diagram of a spherical aberration, aberrations for the wavelength of 656.3 nm (C-line) and the wavelength of 486.1 nm (F-line) are also illustrated. In the diagram of astigmatism, an aberration in a sagittal direction is indicated by a solid line, and an aberration in a tangential direction is indicated by a two-dot dashed line. Further, FNo. represents F-number, and ω represents a half angle of view. In a diagram of a lateral chromatic aberration, aberrations for C-line, F-line and g-line (wavelength is 435.8 nm) are illustrated.

Figure 7:
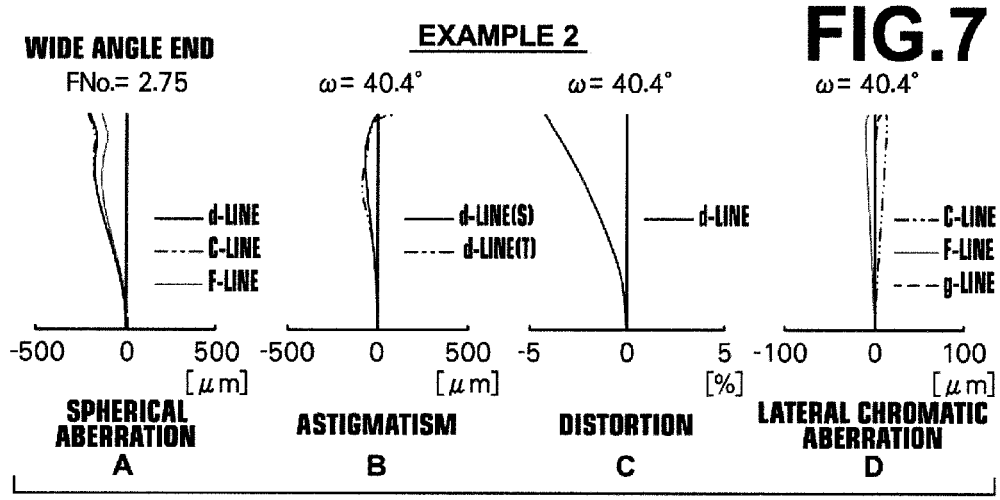
FIG. 7 is various aberration diagrams of the zoom lens in Example 2 at a wide angle end, and Section A shows a spherical aberration, and Section B shows astigmatism, and Section C shows distortion and Section D shows a lateral chromatic aberration.
Figure 8:
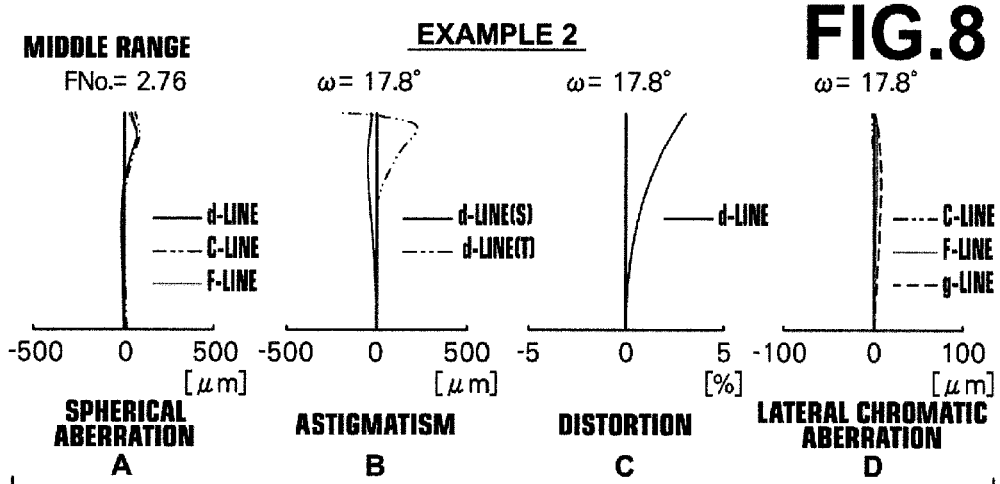
FIG. 8 is various aberration diagrams of the zoom lens in Example 2 in a middle range, and Section A shows a spherical aberration, and Section B shows astigmatism, and Section C shows distortion and Section D shows a lateral chromatic aberration.
Figure 9:
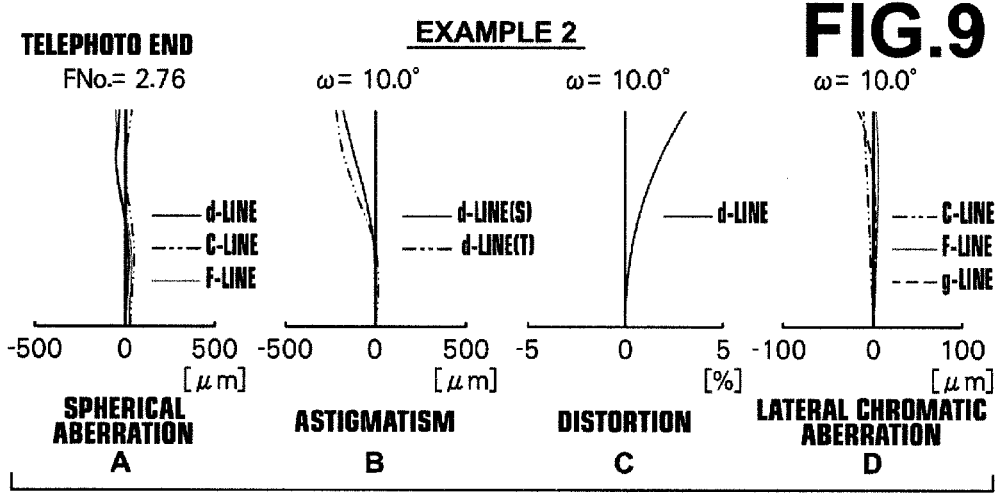
FIG. 9 is various aberration diagrams of the zoom lens in Example 2 at a telephoto end, and Section A shows a spherical aberration, and Section B shows astigmatism, and Section C shows distortion and Section D shows a lateral chromatic aberration.

Similarly, aberrations about the zoom lens in Example 2 are illustrated in FIG. 7, Sections A through D (wide angle end), FIG. 8, Sections A through D (middle range), and FIG. 9, Sections A through D (telephoto end). Similarly, aberrations about the zoom lens in Example 3 are illustrated in FIGS. 10 through 12, Sections A through D.

As numerical value data and aberration diagrams show, in each Example, an F-number is constant in each variable magnification range, and aberrations are excellently corrected. Further, reduction in the size of a zoom lens, as a whole, is achievable.

The present invention is not limited to the aforementioned embodiments nor examples, and various modifications are possible in the embodiments. For example, the values of the curvature radius, a distance between surfaces, a refractive index and the like of lens elements are not limited to the values in the aforementioned examples of numerical values, but may be other values.

What is claimed is:

1. A zoom lens consisting of:
a first lens group having positive refractive power, and which is fixed during magnification change;
a second lens group having negative refractive power, and which moves from an object side toward an image side while magnification is changed from a wide angle end to a telephoto end;
a third lens group having negative refractive power, and which corrects movement of an image plane during magnification change; and
a fourth lens group having positive refractive power, and which is fixed during magnification change and includes a stop, in this order from the object side,
wherein the first lens group consists of a 1a-th lens group having negative refractive power, and which is fixed during focusing, a 1b-th lens group having positive refractive power, and which moves during focusing, and a 1c-th lens group having positive refractive power, and which is fixed during focusing, in this order from the object side, and
wherein the second lens group consists of a 2a-th lens group having negative refractive power and a 2b-th lens group having positive refractive power in this order from the object side, and a distance between the 2a-th lens group and the 2b-th lens group is changed during magnification change, and
wherein the third lens group moves in such a manner that a distance from the fourth lens group at the telephoto end is narrower than a distance from the fourth lens group at the wide angle end, and
wherein the following conditional formulas (1) and (2) are satisfied:

$$5.0 < L/fw < 15.0 \quad (1); \text{ and}$$

$$0.050 < fw/f1b < 0.200 \quad (2), \text{ where}$$

L: a length from a most-object-side surface in the first lens group to the stop,
fw: a focal length at the wide angle end, and
f1b: a focal length of the 1b-th lens group.

2. The zoom lens, as defined in claim 1, wherein the following conditional formula (1-1) is satisfied:

$$7.0 < L/fw < 12.0 \quad (1-1), \text{ where}$$

L: a length from a most-object-side surface in the first lens group to the stop, and
fw: a focal length at the wide angle end.

3. The zoom lens, as defined in claim 1, wherein the following conditional formula (1-2) is satisfied:

$$8.0 < L/fw < 10.0 \quad (1-2), \text{ where}$$

L: a length from a most-object-side surface in the first lens group to the stop, and
fw: a focal length at the wide angle end.

4. The zoom lens, as defined in claim 1, wherein a point at which a distance between the 2a-th lens group and the 2b-th lens group is wider than a distance between the 2a-th lens group and the 2b-th lens group at the wide angle end is included in focal length between the wide angle end and the telephoto end.

5. The zoom lens, as defined in claim 1, wherein the following conditional formula (2-1) is satisfied:

$$0.060 < fw/f1b < 0.150 \qquad (2\text{-}1),\text{ where}$$

fw: a focal length at the wide angle end, and
f1b: a focal length of the 1b-th lens group.

6. The zoom lens, as defined in claim 1, wherein the following conditional formula (2-2) is satisfied:

$$0.070 < fw/f1b < 0.100 \qquad (2\text{-}2),\text{ where}$$

fw: a focal length at the wide angle end, and
f1b: a focal length of the 1b-th lens group.

7. The zoom lens, as defined in claim 1, wherein the 1a-th lens group consists of a 1a1-st lens having a negative meniscus lens shape with its convex surface facing the object side, a 1a2-nd lens with its convex surface facing the object side, and the absolute value of the curvature radius of the convex surface of the 1a2-nd lens being smaller than the absolute value of the curvature radius of the other surface of the 1a2-nd lens, and the 1a2-nd lens including an aspherical surface shaped in such a manner that positive refractive power becomes stronger as a distance from an optical axis increases, and a cemented lens of a 1a3-rd lens having negative refractive power, and a concave surface of which faces the object side, and the absolute value of the curvature radius of the concave surface being smaller than the absolute value of the curvature radius of the other surface of the 1a3-rd lens, and a 1a4-th lens having positive refractive power, and a convex surface of which faces the image side, and the absolute value of the curvature radius of the convex surface of the 1a4-th lens being smaller than the absolute value of the curvature radius of the other surface of the 1a4-th lens, in this order from the object side.

8. The zoom lens, as defined in claim 7, wherein the following conditional formula (3) is satisfied:

$$0.00 < \theta gF1a4 - \theta gF1a3 \qquad (3),\text{ where}$$

θgF1a4: a partial dispersion ratio of the 1a4-th lens with respect to g-line and F-line, and
θgF1a3: a partial dispersion ratio of the 1a3-rd lens with respect to g-line and F-line.

9. The zoom lens, as defined in claim 1, wherein the 1b-th lens group consists of a cemented lens of a 1b1-st lens having negative refractive power, and a cemented surface of which is convex toward the object side, and a 1b2-nd lens having positive refractive power.

10. The zoom lens, as defined in claim 1, wherein the 2a-th lens group consists of a 2a1-st lens having a negative meniscus lens shape with its convex surface facing the object side and a 2a2-nd lens having a biconcave shape in this order from the object side, and
wherein the 2b-th lens group consists of a cemented lens of a 2bp-th lens having a biconvex shape and a 2bn-th lens having negative refractive power, and a concave surface of which faces the object side, and the absolute value of the curvature radius of the concave surface of the 2bn-th lens being smaller than the absolute value of the curvature radius of the other surface of the 2bn-th lens, in this order from the object side.

11. The zoom lens, as defined in claim 10, wherein the following conditional formula (4) is satisfied:

$$1.75 < N2a \qquad (4),\text{ where}$$

N2a: an average refractive index of the 2a-th lens group.

12. The zoom lens, as defined in claim 10, wherein the following conditional formula (4-1) is satisfied:

$$1.83 < N2a \qquad (4\text{-}1),\text{ where}$$

N2a: an average refractive index of the 2a-th lens group.

13. The zoom lens, as defined in claim 10, wherein the following conditional formula (5) is satisfied:

$$20.0 < v2bn - v2bp \qquad (5),\text{ where}$$

ν2bn: an Abbe number of the 2bn-th lens, and
ν2bp: an Abbe number of the 2bp-th lens.

14. The zoom lens, as defined in claim 1, wherein the third lens group consists of a cemented lens of a 3n-th lens having a biconcave shape and a 3p-th lens having positive refractive power, and a convex surface of which faces the object side, in this order from the object side.

15. The zoom lens, as defined in claim 14, wherein the following conditional formula (6) is satisfied:

$$30.0 < v3n - v3p \qquad (6),\text{ where}$$

ν3p: an Abbe number of 3p-th lens L3p, and
ν3n: an Abbe number of 3n-th lens L3n.

16. The zoom lens, as defined in claim 14, wherein the following conditional formula (6-1) is satisfied:

$$40.0 < v3n - v3p \qquad (6\text{-}1),\text{ where}$$

ν3p: an Abbe number of 3p-th lens L3p, and
ν3n: an Abbe number of 3n-th lens L3n.

17. An imaging apparatus comprising:
the zoom lens, as defined in claim 1, mounted thereon.

* * * * *